Oct. 23, 1962  G. ARQUIER  3,060,305
APPARATUS FOR THE HEAT TREATMENT OF SAW TEETH AND ITS
APPLICATION TO SAW SHARPENING MACHINE
Filed Jan. 10, 1961  2 Sheets-Sheet 2
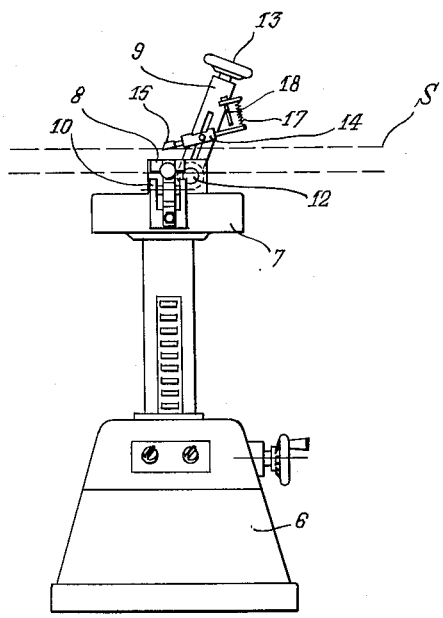
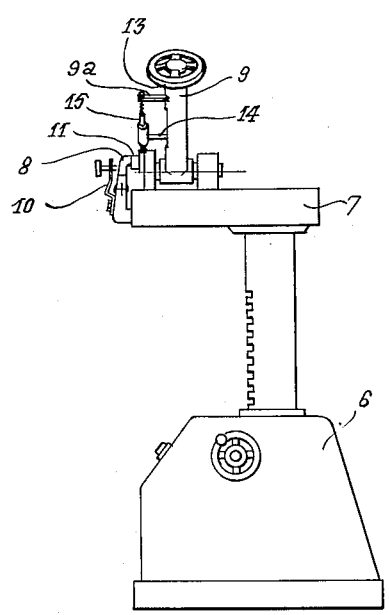
INVENTOR.
GASTON ARQUIER
BY Irvin S. Thompson
ATTY.

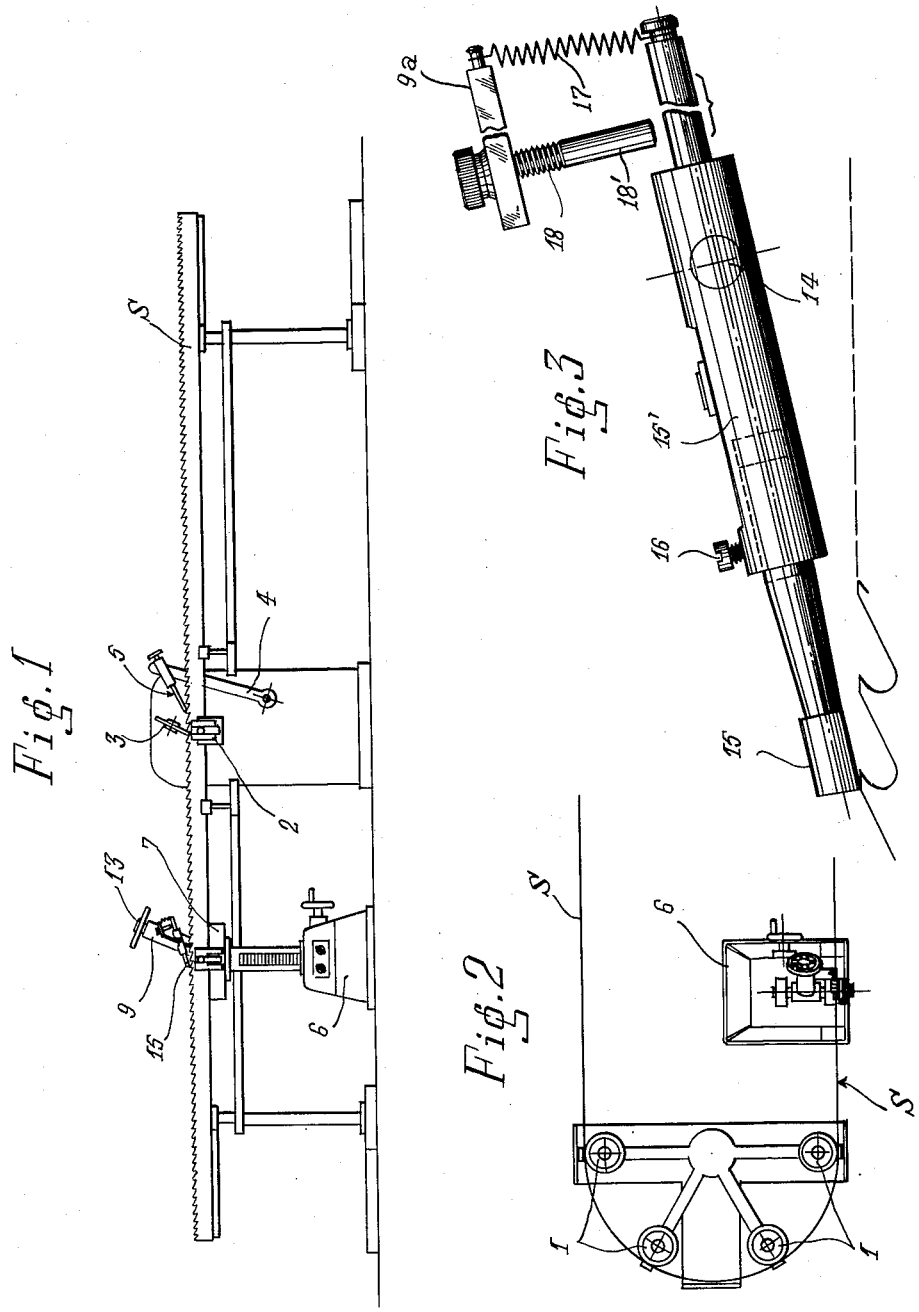

United States Patent Office 3,060,305
Patented Oct. 23, 1962

3,060,305
APPARATUS FOR THE HEAT TREATMENT OF SAW TEETH AND ITS APPLICATION TO SAW SHARPENING MACHINE
Gaston Arquier, 34 Bis Ave. Pessicart, Nice (Alpes-Maritimes), France
Filed Jan. 10, 1961, Ser. No. 81,834
Claims priority, application France Mar. 11, 1960
6 Claims. (Cl. 219—50)

My invention has chiefly for its object to incorporate with a conventional mechanical saw-sharpening machine an arrangement for the heat treatment of the saw teeth after their sharpening with a view to hardening their tips and cutting edges, said arrangement including an electrically conductive contact-piece which is connected with one terminal of a supply of low voltage current, while the actual saw blade is connected with the other terminal of said supply; thus, the saw teeth engage automatically and in succession, upon actual progression of the saw through the sharpening machine, said contact-piece through their tips, whereby the current is allowed to pass through said contact-piece and tooth engaged thereby. Each tooth is thus heated chiefly near its tip and its air cooling following said heating provides the desired quenching or hardening.

The current passes obviously through a switch and an intensity regulator; it may be fed to the saw blade through a vice, the jaws of which may be adjustably clamped over the saw. The contact-piece is carried by a frame which allows adjusting its position both horizontally and vertically with reference to the saw blade, while its slope is also adjustable so that the contact-piece may engage the desired section of the succesive teeth. The contact-piece should engage resiliently the tips of the successive teeth and, to this end, it may be carried pivotally and be urged by a spring against said successive teeth, so that each time it drops into the interval separating two successive teeth, it may slide over the edge of the next tooth which is to engage. My invention is applicable to all types of saws.

The accompanying drawings illustrate by way of exemplification the application of my invention to a bandsaw-sharpening machine. In said drawings:

FIG. 1 is an elevational view of the sharpening machine provided with my improved heat treatment arrangement.

FIG. 2 is a partial plan view thereof.

FIG. 3 is an elevational view on a larger scale showing the contact-pieces and the elastically mounted support thereof.

FIGS. 4 and 5 are front and side views of the pedestal of the heat treatment arrangement provided with said contact-piece and support.

FIG. 1 illustrates a sharpening machine of any suitable known type, intended for use with bandsaws; the saw blade S is carried at the two ends of the machine by semi-circular supports, where it runs over rollers as shown at 1; said blade passes between the jaws 2 of a clamping vice which holds said blade fast each time a tooth passes in front of the grinding wheel 3. A lever 4 which is automatically controlled produces thus the intermittent tooth by tooth progression of the saw through the agency of a push member 5.

According to my invention, said sharpening machine is associated with a heat treatment arrangement carried by the pedestal 6 carrying in its turn a vertical carriage 7 at an adjustable height. Said carriage carries one of the jaws 8 of the vice 8—11 adapted to clamp the saw in registry with the pedestal 6 and it is also provided with a spindle 12 perpendicular to the plane of the saw.

The jaw 8 is urged resiliently by an adjustable spring 10 against the saw blade to make the latter engage the other stationary jaw 11. One of said jaws 8 and 11 is electrically insulated from the remainder of the machine and is connected with one of the terminals of a supply, not illustrated, which feeds current into the arrangement. A lever 9 carried by the horizontal spindle 12 may be locked in any desired angular position. The lever 9 which is shown in the drawings as being tubular, forms a slideway for an inner slider, the position of which is controlled through a threaded member by the handwheel 13. Said slider carries the pivot 14 round which the contact-piece 15 may rock freely.

The contact-piece 15, as illustrated in FIG. 3, is carried on the pivot 14 inside a sleeve 15′ with reference to which it may slide longitudinally to be locked thereon by the clamping screw 16. Said sleeve 15′ is adapted to rock freely round the pivot 14 and is subjected to the action of a spring 17 secured to a part 9a rigid with the lever 9. A screw 18 which is also carried by said lever 9 forms through its tip 18′ an adjustable abutment adapted to limit the upward return stroke of the sleeve 15′.

The different adjustments which are possible for the carriage 7, the lever 9, the pivot 14 of the contact-piece 15 and the position of the contact-piece inside the sleeve allow giving the contact-piece the desired position for contact with a tooth when the bandsaw has entered a position corresponding to the sharpening of another tooth by the grinding wheel 3.

The operation of the arrangement is obvious. When the saw blade is in a position corresponding to the sharpening of one tooth, the contact-piece 15 feeds current to a tooth which has been precedingly sharpened and which engages it at said moment, said tooth being brought to the desired temperature as provided by adjustment of the intensity of the current passing thus through it. When the saw progresses now by one further interval under the action of the push member 5 of the sharpening machine, the contact-piece drops into the interval between two teeth and it is held back, at a predetermined point of its dropping movement above the trough between the teeth, by the abutment 18′. This being done, and towards the end of this progression by one tooth interval of the saw blade, the next tooth engages slidingly the underside of the contact-piece 15 and raises the latter against the action of the spring 17, whereby an excellent contact is ensured between the contact-piece and the tooth. The operation is thus entirely automatic.

When the bandsaw has passed entirely through the sharpening machine and all the teeth have been hardened, it is possible to switch off the current and to shift the contact-piece away, so as to allow the saw blade to continue moving along in the sharpening machine, whereby the operation is brought to an end by a slight whetting.

For the cooling of the heated tooth tips, it is possible to associate with the arrangement disclosed means for projecting onto the successive teeth a jet of air, gas, liquid, salt or the like, so as to make the quenching speedier.

Obviously, the design and detail features of the arrangement carrying the contact-piece may vary in accordance with the type of saw, whether of the bandsaw, circular or the like type; in other words, according to the type of sharpening to be considered.

It will be readily understood that if the heat treatment arrangement is associated with a sharpening machine as should be the general case, the tooth by tooth progression of the saw is controlled by the mechanism provided for this purpose in the sharpening machine, but if the heat treatment arrangement is used alone, it should be provided with a mechanism adapted to make the saw progress stepwise in a manner similar to that which is conventionally used in sharpening machines.

What I claim is:

1. In a machine in which the saw teeth of a saw follow a predetermined path, an arrangement for electrically heating the successive teeth of the saw to produce their subsequent quenching and hardening, comprising a contact-piece lying in the path followed by the saw teeth, a vertically adjustable table facing a point of the path of the saw teeth, a lever mounted in an angularly adjustable position on said table, in a plane parallel with the path of the saw teeth, an auxiliary member rockably and slidably carried by said lever in said last-mentioned plane and carrying said contact-piece at a point of its length, a supply of current including terminals respectively connected with the saw and with the contact-piece, and means connected urging automatically the contact-piece into engagement with the tips of the successive teeth during their progression along their path to ensure thereby the passage of current and the consequent heating of said tips.

2. Apparatus for heat treating teeth of a saw by contact with an electrode in combination with a saw sharpener having means for automatically advancing the saw comprising a fixed base, jaw means for guiding and clamping the saw body, horizontal pivotal means carried by the base, means for adjusting the position of the pivot means horizontally in a direction parallel to the saw and vertically, and an electrode mounted on said pivot means for free pivotal movement thereabout for applying the end of said electrode on the points of the teeth of the saw.

3. Apparatus according to claim 2 in which the pivot means is carried by a slide adjustably slidable in a guide and provided with means for fixing the slide in adjusted positions which guide is mounted to swing about a horizontal axis carried by the base and be fixed in adjusted positions.

4. Apparatus according to claim 2 in which the electrode is axially adjustably slidably mounted in a sleeve pivotally mounted on said pivot means.

5. Apparatus according to claim 2 in which the electrode is resiliently urged to bring its end against the teeth of the saw.

6. Apparatus according to claim 5 in which stop means are provided to limit the movement of the electrode towards the saw between the teeth.

References Cited in the file of this patent

FOREIGN PATENTS 498,785     Italy _____ Sept. 30, 1954